US012687021B2

(12) United States Patent
Jones et al.

(10) Patent No.: US 12,687,021 B2
(45) Date of Patent: Jul. 21, 2026

(54) COVER BOARD WITH HONEYCOMB LAYER

(71) Applicant: BMIC LLC, Dallas, TX (US)

(72) Inventors: Jason Jones, Tustin, CA (US); Kenneth Lloyd Willoughby, Jr., Wills Point, TX (US); Trieu Nguyen, Plano, TX (US)

(73) Assignee: BMIC LLC, Dallas, TX (US)

( * ) Notice: Subject to any disclaimer, the term of this patent is extended or adjusted under 35 U.S.C. 154(b) by 481 days.

(21) Appl. No.: 17/894,553

(22) Filed: Aug. 24, 2022

(65) Prior Publication Data

US 2023/0064072 A1     Mar. 2, 2023

Related U.S. Application Data

(60) Provisional application No. 63/236,907, filed on Aug. 25, 2021.

(51) Int. Cl.
*E04D 11/02*         (2006.01)
*B32B 3/12*          (2006.01)
(Continued)

(52) U.S. Cl.
CPC ................ *E04D 11/02* (2013.01); *B32B 3/12* (2013.01); *B32B 7/08* (2013.01); *B32B 7/12* (2013.01);
(Continued)

(58) Field of Classification Search
CPC .......... B32B 2262/101; B32B 2419/06; B32B 5/022; B32B 7/12; Y10T 428/24149; Y10T 428/24165
See application file for complete search history.

(56) References Cited

U.S. PATENT DOCUMENTS 2,218,791 A * 10/1940 Herscovitz ............ E04F 13/147
                                                    D25/151
5,106,668 A     4/1992 Turner et al.
(Continued)

FOREIGN PATENT DOCUMENTS

AU        198813123 A      11/1988
CA        1321130 C        8/1993
(Continued)

OTHER PUBLICATIONS

Notification of Transmittal of The International Search Report and Written Opinion for International Patent Application No. PCT/US22/41374 dated Feb. 2, 2023.

*Primary Examiner* — Brian E Glessner
*Assistant Examiner* — Daniel J Kenny
(74) *Attorney, Agent, or Firm* — GREENBERG TRAURIG, LLP

(57)         ABSTRACT

A cover board and roofing system including a cover board are disclosed. In one embodiment, the cover board includes a honeycomb layer positioned between a first face sheet and a second face sheet. The honeycomb layer comprises a honeycomb structure having a plurality of partition walls forming a plurality of cells. When the cover board is applied as part of a roof structure, including an insulation layer and a roof deck below the cover board, the roof structure exceeds requirements for Very Severe Hail Resistance according to the FM Approvals FM 4470 VSH impact resistance testing standard for Single-Ply, Polymer-Modified Bitumen Sheet, Built-Up Roof (BUR) and Liquid Applied Roof Assemblies.

17 Claims, 5 Drawing Sheets

(51) Int. Cl.

| | |
|---|---|
| *B32B 7/08* | (2019.01) |
| *B32B 7/12* | (2006.01) |
| *E04D 12/00* | (2006.01) |
| *E04D 13/16* | (2006.01) |

(52) U.S. Cl.

CPC ....... *E04D 12/002* (2013.01); *E04D 13/1681* (2013.01); *B32B 2250/03* (2013.01); *B32B 2250/40* (2013.01); *B32B 2307/558* (2013.01); *B32B 2307/712* (2013.01); *B32B 2307/73* (2013.01); *B32B 2419/06* (2013.01)

(56) References Cited

U.S. PATENT DOCUMENTS

| | | | |
|---|---|---|---|
| 5,443,884 A * | 8/1995 | Lusignea | C08L 79/08 264/331.12 |
| 5,714,226 A | 2/1998 | Disselbeck | |
| 5,958,549 A | 9/1999 | Jaegers et al. | |
| 6,017,413 A | 1/2000 | Franklin et al. | |
| 6,183,837 B1 | 2/2001 | Kim | |
| 6,253,530 B1 | 7/2001 | Price et al. | |
| 6,569,509 B1 | 5/2003 | Alts | |
| 6,588,171 B2 | 7/2003 | Pryor et al. | |
| 6,753,061 B1 * | 6/2004 | Wedi | B32B 27/32 428/314.2 |
| 6,890,023 B2 | 5/2005 | Preisler et al. | |
| 9,540,811 B2 | 1/2017 | Rapaz | |
| 9,845,600 B2 | 12/2017 | Sypeck | |
| 9,920,200 B2 * | 3/2018 | Zhou | D06N 5/003 |
| 10,787,814 B2 | 9/2020 | Duque et al. | |

| | | | |
|---|---|---|---|
| D907,813 S | 1/2021 | Holloway | |
| 11,319,708 B2 * | 5/2022 | Leatherman | B32B 5/028 |
| 2008/0086982 A1 * | 4/2008 | Parenteau | E04C 2/365 52/794.1 |
| 2008/0268225 A1 | 10/2008 | Dehennau et al. | |
| 2011/0281063 A1 * | 11/2011 | Levit | B32B 27/04 428/116 |
| 2013/0065020 A1 | 3/2013 | Loftus et al. | |
| 2015/0059277 A1 | 3/2015 | Collins | |
| 2020/0123776 A1 | 4/2020 | Leatherman et al. | |

FOREIGN PATENT DOCUMENTS

| | | | |
|---|---|---|---|
| CN | 1183076 A | 5/1998 | |
| CN | 1265961 A | 9/2000 | |
| CN | 101270595 B | 4/2010 | |
| CN | 101942875 A | 1/2011 | |
| CN | 102191838 A | 9/2011 | |
| CN | 207579234 U | 7/2018 | |
| CN | 208918101 U | 5/2019 | |
| CN | 209211615 U | 8/2019 | |
| CN | 111267455 A | 6/2020 | |
| DE | 2458260 A1 | 6/1976 | |
| GB | 2341619 A | 3/2000 | |
| GB | 2347440 A | 9/2000 | |
| JP | 63290726 A | 11/1988 | |
| JP | 7329197 A | 12/1995 | |
| JP | 8238699 A | 9/1996 | |
| JP | 2007177528 A | 7/2007 | |
| WO | WO 94/17995 A1 | 8/1994 | |
| WO | WO 96/30202 A1 | 10/1996 | |
| WO | WO 00/30845 A1 | 6/2000 | |

* cited by examiner

302

304

306

308

100/200

TPO Peeled off - there is only a small dent and no cracking

Top Facer Cracks and Foam Damaged

COVER BOARD WITH HONEYCOMB LAYER

REFERENCE TO RELATED APPLICATION

The present patent application claims the benefit of U.S. Provisional Application No. 63/236,907, filed Aug. 25, 2021.

INCORPORATION BY REFERENCE

The disclosures made in U.S. Provisional Application No. 63/236,907, filed Aug. 25, 2021, are specifically incorporated by reference herein as if set forth in their entirety.

TECHNICAL FIELD

This disclosure relates generally to roofing systems and more particularly to roofing systems with cover boards reinforced to resist impacts.

BACKGROUND

Cover boards are a common failure point for single ply roofing systems that may be exposed to very severe hail. Insurers have created specific testing requirements for certifications for hail resistant roofing systems. In particular, for the "Very Severe Hail" (VSH) classification, requirements include the ability to withstand 2-inch ice balls propelled at 152-160 feet per second, resulting in an impact energy of 53-58 ft-lbs. Damage to cover boards due to impacts, such as from hail, may further result in damaged insulation panels or damage to other layers of the roofing system, which typically will require replacement of such materials. Impact damage also may cause additional issues if left alone, e.g., water damage resulting from water intrusion or ingress through cracked or damaged areas.

Accordingly, it can be seen that needs exist for a cover board that can provide resistance to impacts from very severe hail and/or other types or levels of impact resistance. The present disclosure addresses these and other related and unrelated issues.

SUMMARY

Briefly described, according to various aspects of the present disclosure, a roofing system includes a cover board comprising a first face sheet. In embodiments, the cover board comprises a honeycomb layer positioned adjacent to a first face sheet. The honeycomb layer comprises a honeycomb structure having a plurality of partition walls forming a plurality of cells. The cover board also can include a second face sheet, with the first and second face sheets positioned such that the honeycomb layer of the core is positioned between the first face sheet and the second face sheet. When the cover board is applied as part of a roof structure, which, in embodiments, can include an insulation layer and a deck of the roof structure over which the cover board is positioned, the roof structure exceeds requirements for Very Severe Hail Resistance according to FM Approvals FM 4470 VSH impact resistance testing standard for Single-Ply, Polymer-Modified Bitumen Sheet, Built-Up Roof (BUR) and Liquid Applied Roof Assemblies.

Various aspects of a cover board or roofing systems and methods include, without limitation a cover board, comprising a first face sheet; a honeycomb layer positioned adjacent to the first face sheet, the honeycomb layer comprising a honeycomb structure having a plurality of partition walls forming a plurality of cells; a second face sheet positioned such that the honeycomb layer is between the first face sheet and the second face sheet; and wherein, when the cover board is applied as part of a roof structure including an insulation layer and a deck below the cover board, the roof structure exceeds requirements for Very Severe Hail Resistance according to FM Approvals FM 4470 VSH impact resistance testing standard for Single-Ply, Polymer-Modified Bitumen Sheet, Built-Up Roof (BUR) and Liquid Applied Roof Assemblies.

In embodiments of the cover board, each of the plurality of cells comprise a triangular, quadrilateral, pentagonal, hexagonal, heptagonal, or octagonal cross-section.

In some embodiments of the cover board, the honeycomb layer comprises a thickness of approximately 2 mm to 30 mm, and wherein the first face sheet and the second face sheet each comprise a glass, polymer, paper sheet, or a combination thereof, having a thickness of approximately 20 mils to 100 mils.

In some embodiments of the cover board, the first face sheet and the second face sheet each comprise paper, glass, a thermoplastic polyolefin, polycarbonate, polypropylene, polyaramid, polyethylene, or a combination thereof.

In some embodiments of the cover board, the honeycomb structure comprises a density of approximately 2 cells to 10 cells per 10 mm$^2$.

In some embodiments of the cover board, the cover board comprises a flexible sheet adapted to be applied over the insulation layer at a site of installation of the roof structure.

In some embodiments of the cover board, the honeycomb layer comprises a thermoplastic polyolefin, a polycarbonate, a polypropylene, a polyaramid, a polyethylene, metal, or combination thereof.

In some embodiments of the cover board, each of the plurality of cells further comprises a chamber defined by the walls of each cell.

In some embodiments of the cover board, the chamber of each cell is at least partially filled with a foam, solid, flexible, or resilient material, or combination thereof.

In some embodiments of the cover board, at least one of the first face sheet and second face sheet comprise a polymer membrane material configured to provide water shedding, resistance to water-ponding, resistance to migration.

In another aspect, a method is provided, comprising attaching an insulation layer comprising polyisocyanurate to a deck of a roof structure; positioning a cover board over the insulation layer, the cover board comprising a first face sheet, a honeycomb layer positioned adjacent to the first face sheet, the honeycomb layer comprising a honeycomb structure having a plurality of partition walls forming a plurality of cells, and a second face sheet positioned such that the honeycomb layer is between the first face sheet and the second face sheet; and attaching a water shedding layer to an upper surface of the cover board; wherein the roof structure exceeds requirements for Very Severe Hail Resistance according to FM Approvals FM 4470 VSH impact resistance testing standard for Single-Ply, Polymer-Modified Bitumen Sheet, Built-Up Roof (BUR), and Liquid Applied Roof Assemblies.

In embodiments, the method further comprises attaching a membrane layer over the insulation layer prior to positioning the cover board over the insulation layer.

In embodiments, the method further comprises attaching the cover board to the insulation layer by adhesive, laminating, welding, fasteners, or combinations thereof.

In another aspect, a roofing system, comprising a deck is provided, an insulation material positioned over the deck; and a cover board positioned over the insulation material, the cover board configured to provide very severe hail resistance and comprising a first face sheet, a honeycomb layer positioned adjacent to the first face sheet, the honeycomb layer comprising a honeycomb structure having a plurality of partition walls forming a plurality of cells, and a second face sheet positioned such that the honeycomb layer is between the first face sheet and the second face sheet; wherein the roofing system exceeds requirements for Very Severe Hail Resistance according to FM Approvals FM 4470 VSH impact resistance testing standard for Single-Ply, Polymer-Modified Bitumen Sheet, Built-Up Roof (BUR), and Liquid Applied Roof Assemblies.

In embodiments, the roofing system further comprises an underlayment positioned over the insulation material and below the cover board, the underlayment comprising a polymer membrane configured to provide resistance to migration of water therethrough.

In some embodiments of the roofing system, the cover board is attached over the insulation material by an adhesive, lamination, welding, a mechanical connection, or a combination thereof.

In some embodiments of the roofing system, the insulation material comprises a layer of polyisocyanurate foam.

In some embodiments of the roofing system, the first face sheet and second face sheet each comprise a face sheet formed from paper, glass, plastic, polymer, or combination thereof.

In embodiments of the roofing system, each of the cells of the plurality of cells comprises a chamber, and further comprising a foam, solid, flexible, resilient material, or a combination thereof, received within the chambers of at least a portion of the cells of the plurality of cells.

In embodiments of the roofing system, the honeycomb layer comprises a thermoplastic polyolefin, a polycarbonate, a polyaramid, a polyethylene, a metal, or a combination thereof.

Accordingly, embodiments of cover boards, roofing systems and methods for forming cover boards that are directed to the above discussed and other needs are disclosed. The foregoing and other advantages and aspects of the embodiments of the present disclosure will become apparent and more readily appreciated from the following detailed description, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The embodiments of the present disclosure will now be described in more detail with reference to the attached drawing figures.

In accordance with the principles of the present disclosure, cover boards are described herein that are configured to withstand damage from hail or other objects and prevent damage from hail or other objects to other layers of a roofing system. In embodiments as illustrated in FIGS. 1A-4, the cover boards 100 (FIGS. 1A-1B) and 200 (FIG. 2) at least one honeycomb layer 106. In embodiments, the at least one honeycomb layer 106 will be positioned between a first face sheet and a second face sheet, and can define a core of the cover board.

Other layers of different materials may be disposed or attached to other layers of the cover board. For example, in embodiments, one side of the honeycomb layer may be arranged adjacent to, or can be attached to, a polyisocyanurate insulation material or additional cover board, such as, for example and without limitation, an Energy Guard™ HD or Energy Guard NH™ polyisocyanurate insulation material as manufactured by GAF of Parsippany, New Jersey. In addition, in embodiments, an underlayment, which can include a polymer membrane, can be applied over the insulation layer, positioned between the insulation layer and a lower surface of the cover board.

Cover boards 100 (FIGS. 1A-1B) and 200 (FIG. 2) including a honeycomb layer, as well as roof structures formed by a roofing system incorporating such cover boards as disclosed herein, are configured to withstand very severe hail, and/or different levels of impacts from a variety of sources. For a roofing system or components of a roofing system to achieve certification or classification as a hail resistant roofing system, including to achieve a "Very Severe Hail" (VSH) certification or classification (Class 4—the most stringent certification), the roofing system and components thereof generally must meet the requirements provided under Factory Mutual (FM)® hail-resistant test method ANSI/FM 4473, "Approval Standard for Single-Ply, Polymer-Modified Bitumen Sheet, Built-Up Roof (BUR) and Liquid Applied Roof Assemblies for use in Class 1 and Noncombustible Roof Deck Construction." The ANSI/FM 4473 testing for Very Severe Hail Resistance requires the roofing system withstand up to 2-inch ice balls propelled at 152-160 feet per second, resulting in an impact energy of 53-58 ft. lbs.

Figure 1A:
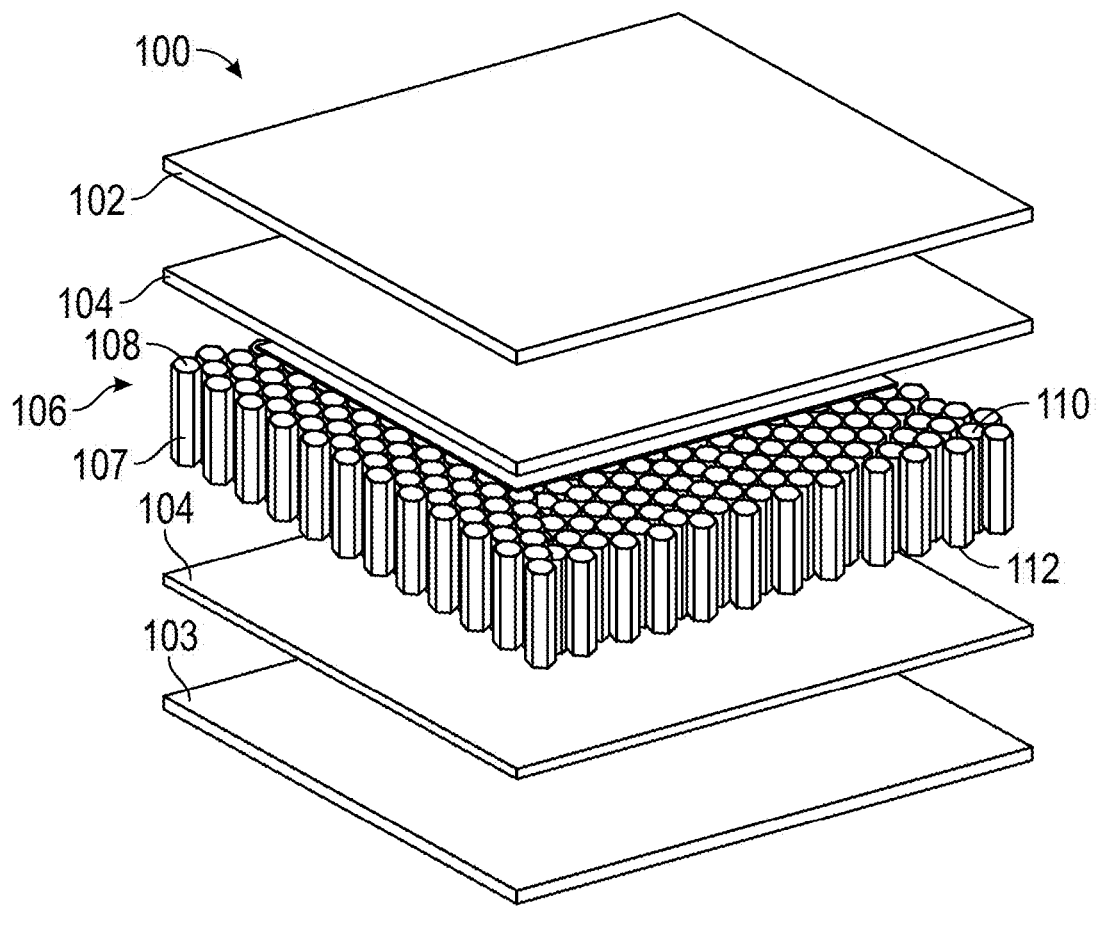
FIG. 1A and FIG. 1B show a cover board according to embodiments of the present disclosure.
Figure 1B:
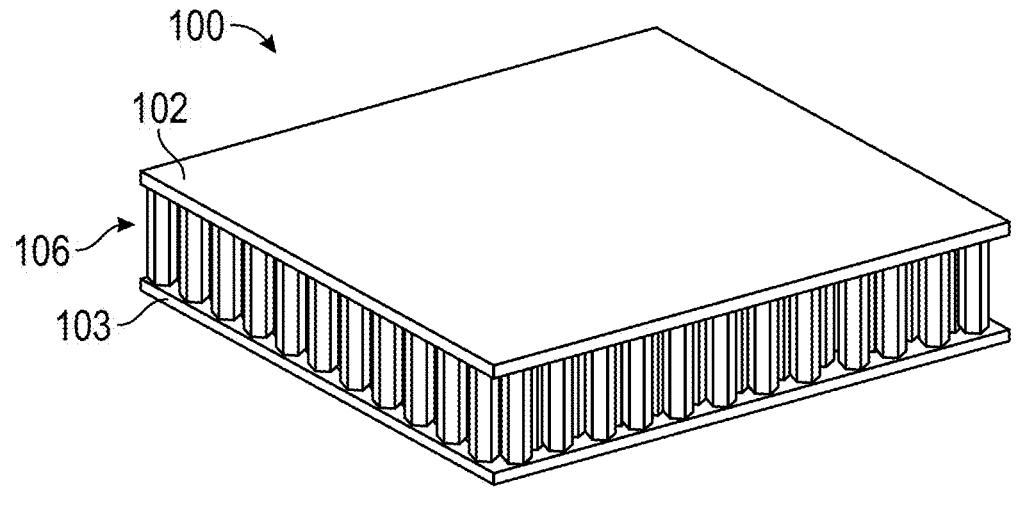
Figure 2:
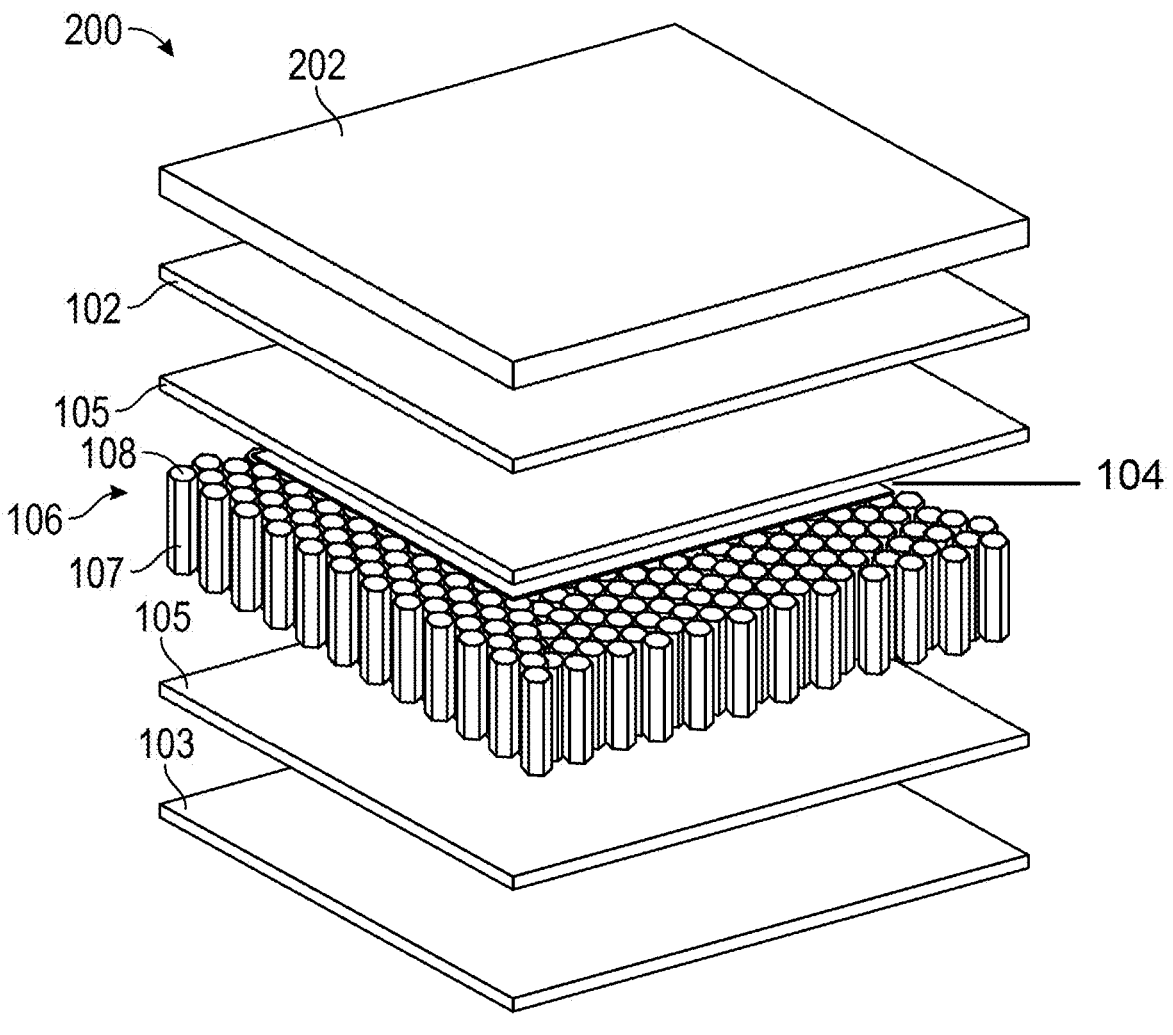
FIG. 2 shows a cover board including a honeycomb layer according to additional embodiments of the present disclosure.

In embodiments, the honeycomb layer 106 may be comprised of various materials, such as a thermoplastic polyolefin, a polycarbonate, a polypropylene, a polyaramid, a polyethylene, metal, or some combination thereof. As shown in FIGS. 1A-2, the honeycomb layer 106 is formed or constructed with a plurality of partition walls 107 that define a plurality of cells 108. The number of cells 108 per square millimeter (mm$^2$) may vary depending on the size and intended use of the cover board. For example, for use of the cover board in roofing systems in regions that experience very severe hail, then the number of cells per mm$^2$ may be increased.

FIGS. 1A-4 illustrate non-limiting example embodiments of cover boards and a roofing system according to the present disclosure. As shown in FIG. 1A and FIG. 1B, a cover board 100 includes a first face sheet 102, a honeycomb layer 106, and a second face sheet 103. The first face sheet 102 is attached to a first side 110 of the honeycomb layer 106, such as via an adhesive, by mechanical connection, or combination thereof. For example, as illustrated in FIG. 1A, the first face sheet 102 may attach or connect to the first side 110 of the honeycomb layer 106 via an adhesive layer 104. The adhesive layer 104 can include a contact adhesive, a pressure sensitive adhesive or other, similar bonding agent. The second face sheet 103 similarly may attach or connect to a second side 112 of the honeycomb layer 106 via an adhesive layer 104. As illustrated in FIGS. 1A-1B, the honeycomb layer 106 will be combined or sandwiched between the first and second face sheets to thereby form a cover board 100.

In embodiments, each of the face sheets (e.g., the first face sheet 102 and the second face sheet 103) may comprise a thin sheet or film, for example, a sheet or film having a thickness of 40 mils to 60 mils. Other thicknesses of the face sheets 102/103 also can be used, such as, in embodiments, 10 mils to 200 mils, 25 mils to 200 mils, 50 mils to 200 mils, 75 mils to 200 mils, 100 mils to 200 mils, 125 mils to 200 mils, 150 mils to 200 mils, 175 mils to 200 mils, 10 mils to 175 mils, 25 mils to 175 mils, 50 mils to 175 mils, 75 mils to 175 mils, 100 mils to 175 mils, 125 mils to 175 mils, 150 mils to 175 mils, 10 mils to 150 mils, 25 mils to 150 mils, 50 mils to 150 mils, 75 mils to 150 mils, 100 mils to 150 mils, 10 mils to 125 mils, 25 mils to 125 mils, 50 mils to 125 mils, 75 mils to 125 mils, 100 mils to 125 mils, 10 mils to 100 mils, 25 mils to 100 mils, 50 mils to 100 mils, 75 mils to 100 mils, 10 mils to 75 mils, 25 mils to 75 mils, 50 mils to 75 mils, 10 mils to 60 mils, 20 mils to 60 mils, 30 mils to 60 mils, 40 mils to 60 mils, 50 mils to 60 mils, or other thicknesses.

In embodiments, each of the face sheets may be comprised of a polymer membrane material, such as a thermoplastic polyolefin (TPO). The polymer membrane material may be configured to provide various properties to the cover board 100 when installed as part of a roofing system or structure to form a roof, such a water shedding (e.g. facilitating flowing of water away from the cover board 100 and away from roofing system or structure); water resistance for the cover board 100 (e.g., resistance to the passage of water flow therethrough); water ponding (e.g., unwanted pooling or collection of water on the cover board 100); ultra violet light (UV) resistance, and other selected properties. In other embodiments, the face sheets may be comprised of paper, glass, glass reinforced materials, coated glass materials, perlite, cellulosic fiber, oriented strand board, plywood, other materials suitable for roofing systems, or some combination thereof.

Still further, in embodiments, a surface treatment configured to provide shock absorption or dampening effects to help absorb, dissipate and/or spread energy from impacts of objects such as very severe hail can be applied over at least an outer facing surface of the face sheet 102. In embodiments, the surface treatment can be applied between the face sheet and the honeycomb layer 106, or applied both on top of the face sheet and between the face sheet and honeycomb layer. Such surface treatment can, in various embodiments, comprise a protective coating, sheet, film or mat formed from acrylic, polyurethane, silicone material, a rubber, polyester, polyvinyl alcohols, polyurea, epoxy/amine, polyamide, or combinations thereof. In some embodiments, one or both of the face sheets can incorporate similar properties; for example, one or both face sheets can be formed from an energy absorbing material such as a rubberized mat, or can include an energy absorbing material embedded therein, so as to be able to flex and absorb and/or dissipate at least some of the impact energy from impacts from very severe hail and other objects before such impact energy reaches the core of the cover board.

The honeycomb layer 106 may be comprised of thermoplastic polyolefin, polycarbonate, polypropylene, polyaramid, polyethylene, metal, or some combination thereof. As indicated in FIGS. 1A-1B, the honeycomb layer 106 includes a plurality of partition walls 107, configured and arranged to form a plurality of cells 108. The cells can be arranged in an array that can include a series of rows and columns, or can include a randomized arrangement of cells. The shape of each of the plurality of cells 108 can vary, for example, including cells with triangular, quadrilateral, pentagonal, hexagonal, heptagonal, or octagonal cross-sections, such as illustrated in FIGS. 3A-3D and described further below. In embodiments, the sizes and/or shapes of the cells can be selected to absorb or dissipate impacts.

Still further, in some embodiments, the honeycomb layer can include different configurations of cells 108, and cells that can be formed of different materials. For example, the honeycomb layer 106 can include a first plurality of cells configured to flex and help absorb shock or forces of impact such as from hail; and at least one additional plurality of cells (e.g., at least a second plurality of cells) formed from more rigid materials to provide strength to the honeycomb layer. In some embodiments, the honeycomb layer 106 further can include additional support walls extending between groups of cells, e.g., in embodiments, between rows and/or columns of cells of the array of cells; which support walls can be formed form a strong, substantially rigid material, such as a metal, polymer, or other material, to support adjacent cell walls that can be formed from flexible, more resilient materials adapted to absorb shocks from impacts.

In addition, at least some of the plurality of cells 108 may be hollow, defining a chamber or recess therein. In some embodiments, at least a portion of the chambers may be at least partially filled with a material different than that of the plurality of partition walls. For example, the chambers may be at least partially filled with a foam material, a solid material, a compressible or resilient material, a granular or flowable material, or some combination thereof. The material received within the chambers may be loosely packed into the chambers, sufficient to enable shifting or movement thereof in response to impacts, or can be substantially tightly packed therein; and will at least partially or substantially completely fill the chambers.

As noted, the honeycomb layer 106 includes a plurality of cells 108 formed from or defined by the plurality of partition walls 107. The number of cells 108 per mm$^2$ may vary depending on the intended use of the cover board 100. For uses in regions with severe hail, the honeycomb layer 106 may include a larger number of cells 108 per mm$^2$, as opposed to a lesser amount for regions experiencing less severe hail. In an example, for a VSH resistance rating, the amount of cells per 10 mm$^2$ may be 1 cell to 10 cells, 2 cells to 10 cells, 3 cells to 10 cells, 4 cells to 10 cells, 5 cells to 10 cells, 6 cells to 10 cells, 7 cells to 10 cells, 8 cells to 10 cells, 9 cells to 10 cells, 1 cell to 9 cells, 2 cells to 9 cells, 3 cells to 9 cells, 4 cells to 9 cells, 5 cells to 9 cells, 6 cells to 9 cells, 7 cells to 9 cells, 8 cells to 9 cells, 1 cell to 8 cells, 2 cells to 8 cells, 3 cells to 8 cells, 4 cells to 8 cells, 5 cells to 8 cells, 6 cells to 8 cells, 7 cells to 8 cells, 1 cell to 7 cells, 2 cells to 7 cells, 3 cells to 7 cells, 4 cells to 7 cells, 5 cells to 7 cells, 6 cells to 7 cells, 1 cell to 6 cells, 2 cells to 6 cells, 3 cells to 6 cells, 4 cells to 6 cells, 5 cells to 6 cells, 1 cell to 5 cells, 2 cells to 5 cells, 3 cells to 5 cells, 4 cells to 5 cells, 1 cell to 4 cells, 2 cells to 4 cells, 3 cells to 4 cells, 1 cell to 3 cells, 2 cells to 3 cells, or 1 cell to 2 cells.

In embodiments, the honeycomb layer 106 may be a substantially rigid layer. In some embodiments, the honeycomb layer can be configured as a flexible layer or sheet. For example, the cover board 100 may be configured for use as a replacement or substitute for a typical cover board. In other embodiments, the honeycomb layer can be configured as a flexible sheet material capable of being rolled and unrolled for transport and application to an existing cover board such as an Energy Guard™ HD cover board from GAF of Parsippany, New Jersey, to provide enhanced impact resistance, including to very severe hail, to such cover boards.

In embodiments, the honeycomb layer 106 may have a thickness of 2 mm to 20 mm, 4 mm to 20 mm, 6 mm to 20 mm, 8 mm to 20 mm, 10 mm to 20 mm, 12 mm to 20 mm, 14 mm to 20 mm, 16 mm to 20 mm, 18 mm to 20 mm, 2 mm to 18 mm, 4 mm to 18 mm, 6 mm to 18 mm, 8 mm to 18 mm, 10 mm to 18 mm, 12 mm to 18 mm, 14 mm to 18 mm, 16 mm to 18 mm, 2 mm to 16 mm, 4 mm to 16 mm, 6 mm to 16 mm, 8 mm to 16 mm, 10 mm to 16 mm, 12 mm to 16 mm, 14 mm to 16 mm, 2 mm to 14 mm, 4 mm to 14 mm, 6 mm to 14 mm, 8 mm to 14 mm, 10 mm to 14 mm, 12 mm to 14 mm, 2 mm to 12 mm, 4 mm to 12 mm, 6 mm to 12 mm, 8 mm to 12 mm, 10 mm to 12 mm, 2 mm to 10 mm, 4 mm to 10 mm, 6 mm to 10 mm, 8 mm to 10 mm, 2 mm to 8 mm, 4 mm to 8 mm, 6 mm to 8 mm, 2 mm to 6 mm, 4 mm to 6 mm, or 2 mm to 4 mm. Other thicknesses also could be used.

In embodiments, the total height or thickness of the cover board 100 (e.g., the first face sheet 102, the second face sheet 103, and the honeycomb layer 106) may be 2 mm to 30 mm, 4 mm to 30 mm, 6 mm to 30 mm, 8 mm to 30 mm, 10 mm to 30 mm, 12 mm to 30 mm, 14 mm to 30 mm, 16 mm to 30 mm, 18 mm to 30 mm, 20 mm to 30 mm, 2 mm to 25 mm, 4 mm to 25 mm, 6 mm to 25 mm, 8 mm to 25 mm, 10 mm to 25 mm, 12 mm to 25 mm, 14 mm to 25 mm, 16 mm to 25 mm, 18 mm to 25 mm, 20 mm to 25 mm, 2 mm to 20 mm, 4 mm to 20 mm, 6 mm to 20 mm, 8 mm to 20 mm, 10 mm to 20 mm, 12 mm to 20 mm, 14 mm to 20 mm, 16 mm to 20 mm, 18 mm to 20 mm, 4 mm to 18 mm, 6 mm to 18 mm, 8 mm to 18 mm, 10 mm to 18 mm, 12 mm to 18 mm, 14 mm to 18 mm, 16 mm to 18 mm, 4 mm to 16 mm, 6 mm to 16 mm, 8 mm to 16 mm, 10 mm to 16 mm, 12 mm to 16 mm, 14 mm to 16 mm, 4 mm to 14 mm, 6 mm to 14 mm, 8 mm to 14 mm, 10 mm to 14 mm, 12 mm to 14 mm, 4 mm to 12 mm, 6 mm to 12 mm, 8 mm to 12 mm, 10 mm to 12 mm, 4 mm to 10 mm, 6 mm to 10 mm, 8 mm to 10 mm, 4 mm to 8 mm, 6 mm to 8 mm, or 4 mm to 6 mm. Other thicknesses also can be used.

As noted above, the first face sheet 102 and the second face sheet 103 may be adhesively or mechanically attached to the first side 110 and the second side 112, respectively, of the honeycomb layer 106, via an adhesive layer 104, by laminating, welding, by fasteners, which also can secure the honeycomb layer to a separate cover board or to a roof deck or substrate, or some combination thereof. The adhesive layer 104 may include a contact adhesive, pressure sensitive adhesive, glue, sealant, silicone, rubber, or some combination thereof. By way of example only, in embodiments, a contract type adhesive such as GAF EnergyGuard™ PVC adhesive from GAF of Parsippany, New Jersey, can be used. Other adhesive also can be used, and in other embodiments, the honeycomb layer can be attached to the separate cover board by fasteners or other mechanical connections.

In addition, in some embodiments, the adhesive layer 104 may be applied or formed as a part of the first face sheet 102 and/or the second face sheet 103, with a removable release layer applied thereover, e.g., providing the first face sheet 102 and/or second face sheet 103 with a peel and stick adhesive. The first face sheet 102 and second face sheet 103 also can have an adhesive layer applied along opposite sides thereof such that for installation as part of a roofing system, an installer may peel or remove the release sheet and position the cover board with this adhesive side down, onto the roof deck.

As described herein, the cover board 100 is configured, to withstand severe hail, very severe hail, and/or other types of impact, and exhibiting an impact resistance greater than an impact resistance of an identical cover board without the honeycomb layer 106. The addition of the honeycomb layer 106 enables the cover board 100 to meet and/or exceed standards for achieving a very severe hail (VSH) certification from Factory Mutual (FM)®. The FM Approvals ANSI/FM 4473 VSH impact resistance testing standard includes propelling 2-inch ice balls at 152-160 feet per second, resulting in an impact energy of 53-58 ft-lbs. at the cover board 100. If the cover board 100 does not experience substantial cracks or other damage on either side of the cover board 100 during such testing, which could cause leaks or failures of the other cover boards, then the cover board 100 or other material is rated as able to withstand "Very Severe Hail." Other tests, standards, and/or classifications, such as ASTM D3746, and/or UL 2218, also may be utilized or used to determine hail resistance of the cover board 100. In addition, the cover board 100 with the honeycomb layer 106 generally will exhibit an impact resistance greater than an impact resistance of an identical cover board without the honeycomb layer 106.

Figure 5A:
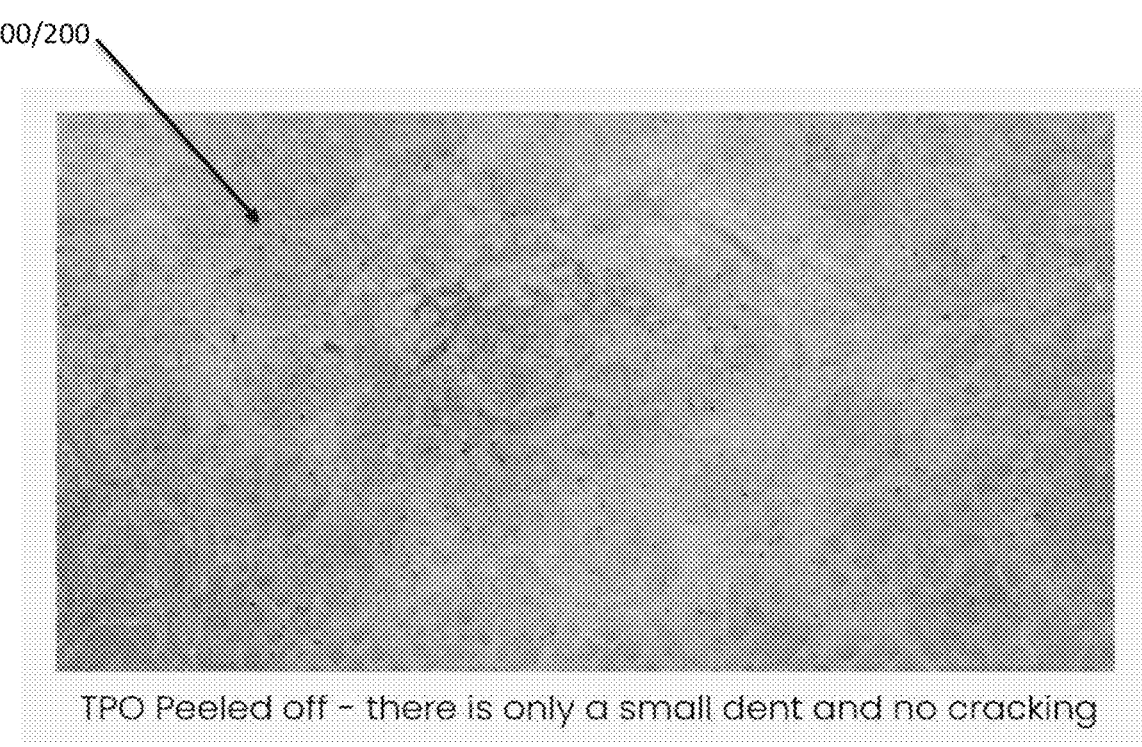
FIGS. 5A-5B illustrate a cover board according to the present disclosure compared with a conventional cover board after each cover board has been subjected to FM Approvals ANSI/FM 4470 VSH impact resistance testing for very severe hail resistance
Figure 5B:
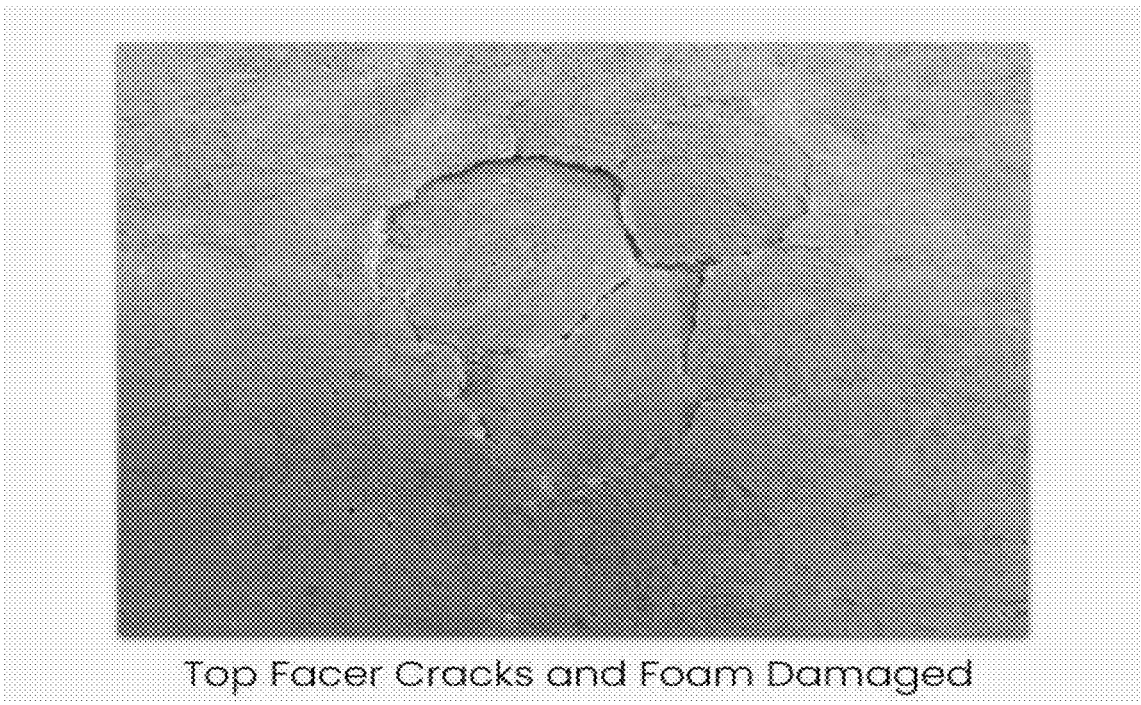

By way of illustration and example only, FIGS. 5A and 5B illustrate a comparison of a cover board 100/200 according to the principles of the present disclosure, in this example, comprising a 6 mm cover board with a honeycomb layer and a 60 mil TPO layer, versus a conventional ½" cover board after each cover board has been subjected to FM Approvals ANSI/FM 4473 VSH impact resistance testing for very severe hail. As can be seen in FIG. 5A, the cover board 100/200, after being impacted with the 2 inch ice ball, showed only a small dent in the cover board after peeling back the TPO layer. By contrast, as shown in FIG. 5B, the conventional cover board showed cracking in the top face sheet and damage to the polyisocyanurate foam therebeneath.

In embodiments, the cover board 100 may be utilized in a Single-Ply roof assembly, a Polymer-Modified Bitumen Sheet roof assembly, a Built-Up Roof (BUR) roof assembly, and a Liquid Applied roof assembly. A plurality of cover boards 100 may be installed in the same manner as typical cover board. Depending upon the application, other roofing materials or components further may be applied or attached to an upper surface 101 (FIG. 2) the first face sheet 102 of the cover board 100, e.g., TPO membranes, liquid roofing materials, resins, sealants, and/or other suitable roofing materials or components. Such roofing materials or components can form or define a water shedding layer and/or can substantially seal the cover board and seams between adjacent cover boards of the plurality of cover boards and provide resistance to penetration of water therethrough.

In FIG. 2, a cover board 200 with a honeycomb layer 106 and a polyisocyanurate layer 202 is illustrated. Rather than a cover board (e.g., cover board 100) comprising a pair of face sheets (e.g., a first face sheet 102 and a second face sheet 103) with the honeycomb layer 106, positioned and captured therebetween, the cover board 200 includes additional layers, such as a polyisocyanurate layer 202, and can include other layers such as indicated at 105 in FIGS. 1A and 2, such as an insulation layer, an underlayment, including a polymer membrane material, a TPO membrane, liquid roofing materials, and other roofing materials, applied to upper and lower surfaces of the cover board. Such extra layers may be positioned between any of the layers described herein, e.g., in embodiments, the polyisocyanurate layer 202 (FIG. 2) may be disposed over the first face sheet 102, over the second face sheet 103, between the first face sheet 102 and the honeycomb layer 106, or between the second face sheet 103 and the honeycomb layer 106.

In embodiments, the polyisocyanurate layer 202 of the cover board 200 may include a polymeric material, polyisocyanurate, high density polyisocyanurate, structural foam materials, flexible polyurethane foams, high resiliency polyurethane foams, combustion modified high resiliency foams, non-polyurethane cushioning foams, as well as other materials suitable for use in a roofing application, or some combination thereof. For example, and without limitation, in embodiments, the polyisocyanurate layer 202 can include an EnergyGuard™ HD cover board as manufactured by GAF of Parsippany, New Jersey.

In addition, the polyisocyanurate layer 202 further may include or comprise an insulating material, or can include a layer of insulating material positioned along of the first and/or second surface of the core or a face sheet applied thereto. The polyisocyanurate layer also can have added reinforcing materials such as fillers, flakes, fibers, particulates, or combinations thereof. For example, in embodiments, the polyisocyanurate layer 202 can incorporate glass or plastic (including recycled glass or plastic materials) fibers, spheres or particulates, amorphous glass, flakes or particulate of metal such as aluminum, mica, carbon fibers, boron fibers, aramid and/or polyaramid fibers, carbon nanotubes, graphene, calcium carbonate materials, oxides such as aluminum oxide, calcium oxide, etc., silica, clay, and other mineral and recycled materials. Such reinforcing materials can be added during the forming process for the core.

In some embodiments, the cover board 200 can include an additional layer or base formed by the polyisocyanurate layer 202 with the honeycomb layer 106 attached thereover. The honeycomb layer 106 can be attached to the polyisocyanurate layer 202 by lamination, adhesives, welding, mechanical fasteners, or some combination thereof. For example, the first and second face sheets may be attached or adhered directly to the honeycomb layer 106 (e.g., via adhesive layers 104), and then can be laminated to the polyisocyanurate layer 202 to form a composite cover board 200. The lamination may be performed through standard cover board manufacturing processes.

Figure 4:
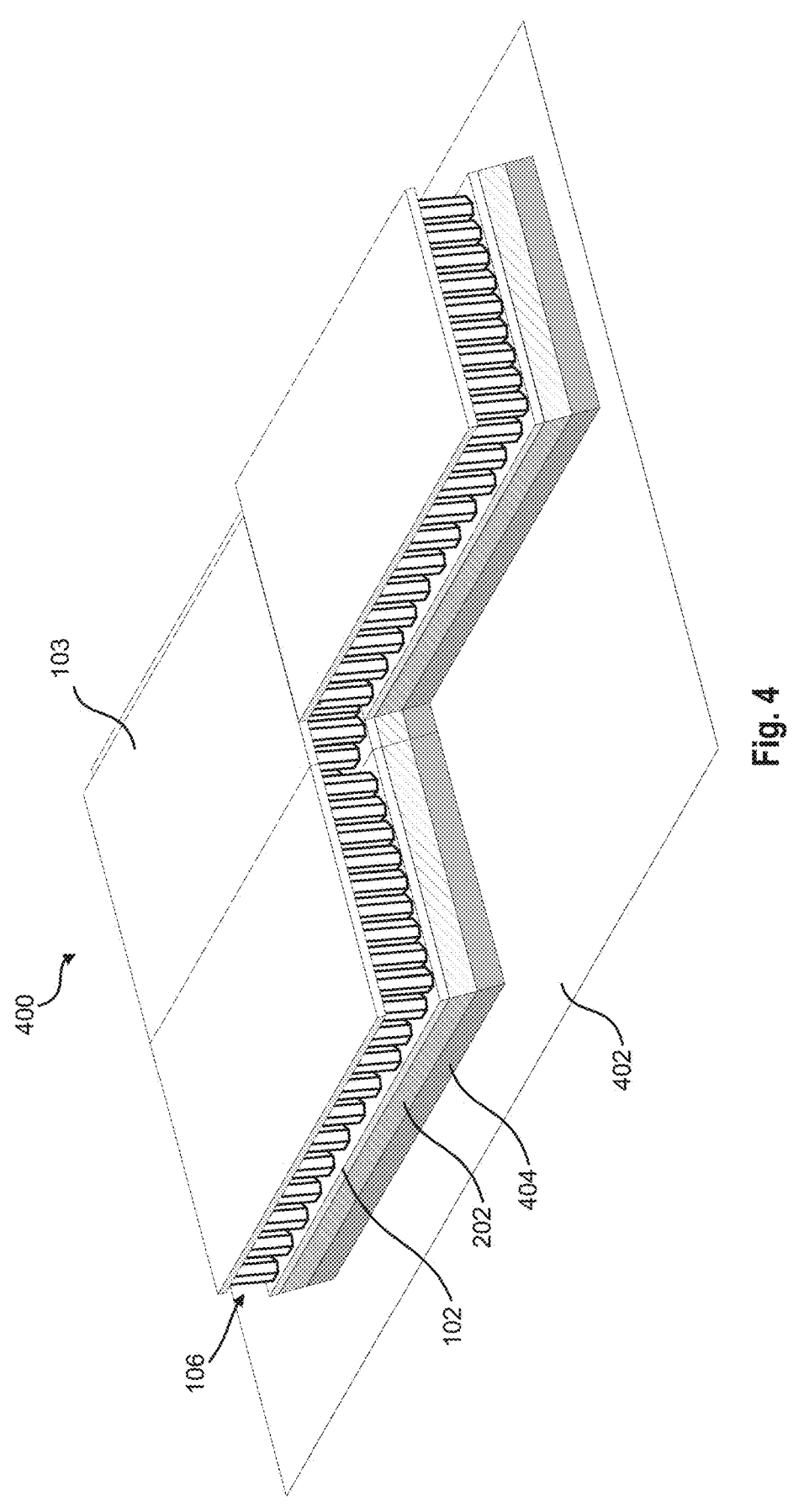
FIG. 4 shows a roofing system with a reinforced cover board according to embodiments of the present disclosure.

In embodiments, the cover board 200 is configured for use in various roofing systems or structures (e.g., Single-Ply, Polymer-Modified Bitumen Sheet, Built-Up Roof (BUR) and Liquid Applied Roof Assemblies), and while FIG. 2 illustrates an embodiment with the polyisocyanurate layer 202 as the top-most layer, the cover board may be installed in a roofing system or structure with the polyisocyanurate layer 202 positioned over and in contact with, for example, an insulation layer or a roof deck also of the roofing system or structure, as is illustrated in FIG. 4.

The polyisocyanurate layer 202 further may comprise a height or thickness similar to that of a typical cover board. For example, in embodiments, the polyisocyanurate layer 202 may be 1 mm to 25 mm thick, 1 mm to 20 mm, 1 mm to 15 mm, 1 mm to 10 mm, 1 mm to 5 mm, 5 mm to 25 mm, 5 mm to 20 mm, 5 mm to 15 mm, 5 mm to 10 mm, 10 mm to 25 mm, 10 mm to 20 mm, 10 mm to 15 mm, 15 mm to 25 mm, 15 mm to 20 mm, or 20 mm to 25 mm. Other thicknesses also can be used. As such, the total height or thickness of the cover board 200 may be an additional 1 mm to 50 mm thicker than the thickness of cover board 100. While the polyisocyanurate layer 202 may appear as thinner than the honeycomb layer 106, as illustrated in FIG. 2, it will be understood that the polyisocyanurate layer 202 may be the same height as, thicker than, or thinner than the honeycomb layer 106.

Figures 3A, 3B, 3C, 3D:
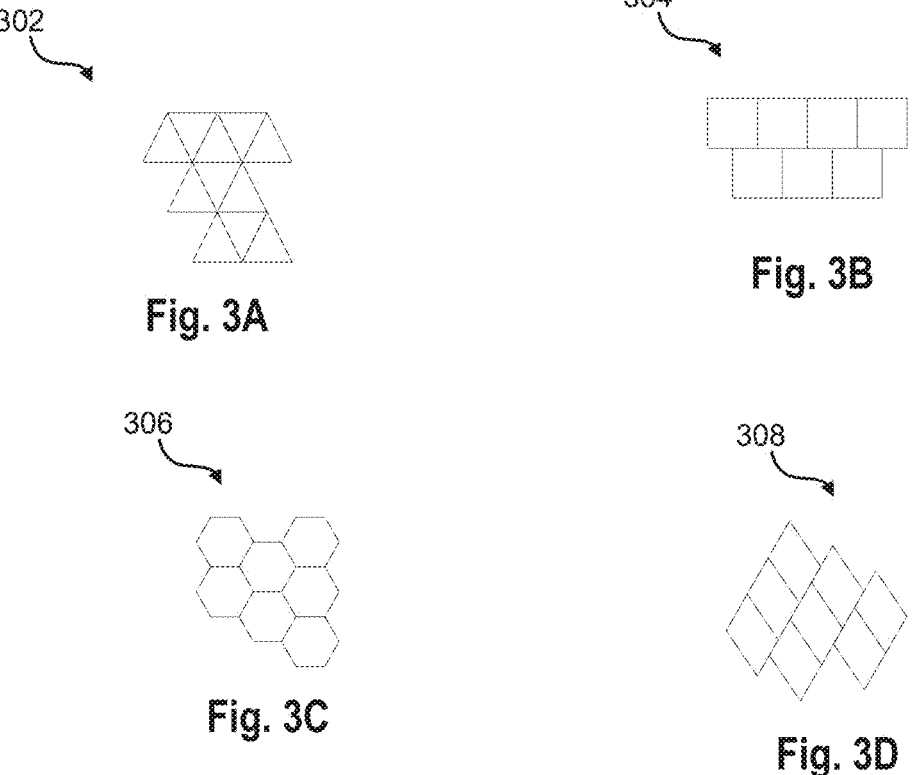
FIGS. 3A, FIG. 3B, FIG. 3C, and FIG. 3D show various example embodiments of honeycomb patterns for use with a cover board according to principles of the present disclosure.

FIG. 3A, FIG. 3B, FIG. 3C, and FIG. 3D, illustrate non-limiting embodiments of various cross-section of shapes in which the plurality of cells of the honeycomb layer 106 of the cover boards 100 and 200 can be formed. The plurality of cells can be configured with a triangular cross-section, quadrilateral cross-section, pentagonal cross-section, hexagonal cross-section, heptagonal cross-section, octagonal cross-section, or other cross-sections for forming honeycomb structure. For example, as illustrated in FIG. 3A, each of the plurality of cells can be formed a triangular shaped cross-section to form a triangular honeycomb pattern 302. As illustrated in FIG. 3B, each of the plurality of cells are formed with a quadrilateral shaped cross-section to form a square or rectangular honeycomb pattern 304. As illustrated in FIG. 3C, each of the plurality of cells are formed with a hexagonal shaped cross-section to form a hexagonal honeycomb pattern 302. As illustrated in FIG. 3D, each of the plurality of cells are formed with a diamond or rhomboid-shaped cross-section forming a diamond shaped honeycomb pattern 302. While particular shapes are illustrated (e.g., triangular, quadrilateral, hexagonal, and diamond), it will be understood that other shapes, as noted above, may be utilized in the honeycomb layer.

In FIG. 4, an example embodiment of a roofing system 400 with a cover board 200 including a honeycomb layer 106 is illustrated. While the roofing system 400 is illustrated with cover board 200, it will be understood that cover board 100 as shown in FIGS. 1A-1B also may be utilized, as well as cover boards with additional layers, and cover boards 100 used in conjunction with or without a polyisocyanurate layer 202 or additional cover board.

In embodiments of an installation of the roofing system 400, the cover board 200 may be transported to a site with the polyisocyanurate layer 202 already attached thereto (e.g., the polyisocyanurate layer 202 may be attached to a honeycomb layer 106 at a factory thereby forming cover board 200), or separately from the polyisocyanurate layer 202. The polyisocyanurate layer 202 may be installed or positioned along a roof deck of the roofing system 400 and the cover board thereafter installed or positioned over the polyisocyanurate layer 202. In others embodiment, utilizing a cover board without a polyisocyanurate layer (e.g., cover board 100), the cover board will be attached directly to the roof deck or can be positioned over an insulation layer 404 and secured to the roof deck.

In FIG. 4, the roofing system 400 includes a deck 402, which may be installed on beams or another supporting structures. The deck 402 may include sheathing and may be comprised of various materials, such as wood (e.g., plywood or oriented strand board) or other materials suitable for roofing systems 400. Prior to installing any of the other components or materials described herein, the deck 402 may be installed at the roofing system 400, thereby forming a base or bottom layer for the roofing system 400.

After installation of the deck 402 at the roofing system 400, an insulation and/or 404 may be installed or positioned over the deck 402. The insulation layer 404 may be comprised of polyisocyanurate or other materials suitable for use as insulation for roofing systems 400. The insulation layer 404 may be attached or connected to the deck via adhesives and/or mechanical connections. The insulation layer 404 may be in the form of sheets or panels. In an embodiment, the cover board 200 may include an insulation layer attached to or integrated therewith, enabling the cover board 200 to be installed or positioned directly over the deck 402 without a separate insulation layer 404.

Once the insulation layer 404 is in place, either the cover board 100/200 or a polyisocyanurate layer 202 may be positioned over the insulation layer 404. In embodiments, an underlayment, which can include a polymer membrane material, further can be positioned over the insulation layer prior to installation of the cover board 100/200 thereover.

After the cover boards 100/200 are installed, a water resistant membrane or liquid roofing material or coating may be applied over each cover board at the roofing system 400. In addition, prior to application of the membrane or liquid roofing material or coating, the joints formed between adjacent cover boards 100/200 may be covered with tape or other suitable materials. Once each joint is covered, the membrane or liquid roofing material or coating may be applied over the cover boards 100/200. In embodiments, the membrane or liquid roofing material or coating will be adapted to substantially seal the resultant roof structure and provide resistance to penetration and/or migration of water through the roof structure defined between adjacent cover boards, water shedding and other properties, as well as further helping to enhance impact resistance of the cover boards and roof structure. With the addition of the cover boards 100/200, the roofing system 400 meets or exceeds VSH testing requirements according to various standards or classifications, thereby allowing for classification of the roofing system 400 as being able to withstand VSH.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure

The invention claimed is:

1. A cover board, comprising:
a first face sheet;
a honeycomb layer positioned adjacent to the first face sheet, the honeycomb layer comprising a honeycomb structure formed of thermoplastic polyolefin, the honeycomb structure having a plurality of partition walls forming a plurality of cells;
a second face sheet positioned such that the honeycomb layer is between the first face sheet and the second face sheet; and wherein each cell has a triangular cross-section and the honeycomb structure has a cell density of 4 to 10 cells per 10 mm$^2$;
wherein, when the cover board is applied as part of a roof structure including an insulation layer and a deck below the cover board, the roof structure exceeds requirements for Very Severe Hail Resistance according to FM Approvals FM 4470 VSH impact resistance testing standard for Single-Ply, Polymer-Modified Bitumen Sheet, Built-Up Roof (BUR), and Liquid Applied Roof Assemblies.

2. The cover board of claim 1, wherein the honeycomb layer comprises a thickness of 2 mm to 30 mm, and wherein the first face sheet and the second face sheet each comprise a glass, polymer or paper sheet having a thickness of approximately 20 mils to 100 mils.

3. The cover board of claim 1, wherein the first face sheet and the second face sheet each comprise a paper, glass, a thermoplastic polyolefin, a polycarbonate, a polypropylene, a polyaramid, or a polyethylene.

4. The cover board of claim 1, wherein the honeycomb structure comprises a density of 1 cell to 10 cells per 10 mm$^2$.

5. The cover board of claim 1, wherein each of the plurality of cells further comprises a chamber defined by the walls of each cell.

6. The cover board of claim 5, wherein the chamber of each cell is at least partially filled with a foam, solid, flexible, or resilient material, or combination thereof.

7. The cover board of claim 1, wherein at least one of the first face sheet and second face sheet comprise a polymer membrane material configured to provide water shedding and resistance to water-ponding.

8. The cover board of claim 1, wherein the honeycomb layer is a flexible sheet material.

9. A method, comprising:
attaching an insulation layer comprising polyisocyanurate to a deck of a roof structure;
obtaining a cover board, the cover board comprising:
a first face sheet;
a honeycomb layer positioned adjacent to the first face sheet, the honeycomb layer comprising a honeycomb structure formed of thermoplastic polyolefin, the honeycomb structure having a plurality of partition walls forming a plurality of cells;
a second face sheet positioned such that the honeycomb layer is between the first face sheet and the second face sheet; and
wherein each cell has a triangular cross-section and the honeycomb structure has a cell density of 4 to 10 cells per 10 mm$^2$;
positioning the cover board over the insulation layer, attaching a water shedding layer to an upper surface of the cover board,
wherein the roof structure exceeds requirements for Very Severe Hail Resistance according to FM Approvals FM 4470 VSH impact resistance testing standard for Single-Ply, Polymer-Modified Bitumen Sheet, Built-Up Roof (BUR), and Liquid Applied Roof Assemblies.

10. The method of claim 9, further comprising attaching a membrane layer over the insulation layer prior to positioning the cover board over the insulation layer.

11. The method of claim 9, further comprising attaching the cover board to the insulation layer by adhesive, laminating, welding, fasteners, or combinations thereof.

12. A roofing system, comprising:
a deck, an insulation material positioned over the deck; and a cover board positioned over the insulation material, the cover board configured to provide severe hail resistance and comprising:

a first face sheet;

a honeycomb layer positioned adjacent to the first face sheet, the honeycomb layer comprising a honeycomb structure formed of thermoplastic polyolefin, the honeycomb structure having a plurality of partition walls forming a plurality of cells;

a second face sheet positioned such that the honeycomb layer is between the first face sheet and the second face sheet;

wherein each cell has a triangular cross-section and the honeycomb structure has a cell pitch-density of 4 to 10 cells per 10 mm$^2$;

wherein, when the cover board is applied as part of a roof structure including an insulation layer and a deck below the cover board, the roof structure exceeds requirements for Very Severe Hail Resistance according to FM Approvals FM 4470 VSH impact resistance testing standard for Single-Ply, Polymer-Modified Bitumen Sheet, Built-Up Roof (BUR), and Liquid Applied Roof Assemblies.

13. The roofing system of claim 12, further comprising an underlayment positioned over the insulation material and below the cover board, the underlayment comprising a polymer membrane configured to provide resistance to migration of water therethrough.

14. The roofing system of claim 12, wherein the cover board is attached over the insulation material by an adhesive, lamination, welding, a mechanical connection, or a combination thereof.

15. The roofing system of claim 12, wherein the insulation material comprises a layer of polyisocyanurate foam.

16. The roofing system of claim 12, wherein the first face sheet and second face sheet each comprise a face sheet formed from paper, glass, plastic, polymer, or combination thereof.

17. The roofing system of claim 12, wherein each of the cells of the plurality of cells comprises a chamber, and further comprising a foam, solid, flexible, resilient material, or a combination thereof received within the chambers of at least a portion of the cells of the plurality of cells.

\* \* \* \* \*